Jan. 30, 1968  R. L. SAUVÉE  3,366,224
CONVEYORS

Filed Feb. 17, 1966  2 Sheets-Sheet 1

Inventor
Robert L. Sauvée
by Sommers+Young
Attorneys

United States Patent Office 3,366,224
Patented Jan. 30, 1968

3,366,224
CONVEYORS
Robert Léon Sauvée, Erith, England, assignor to Sorex Limited, Kent, England, a corporation of Great Britain
Filed Feb. 17, 1966, Ser. No. 528,148
2 Claims. (Cl. 198—158)

This invention concerns improvements relating to conveyors, particularly but not exclusively elevating and/or lowering conveyors of the kind comprising a plurality of trays or other load carriers moved in an endless path past loading and/or unloading points by means of one or more endless chains, wire ropes, belts or the like. The invention seeks to provide simple but effective loading and/or unloading arrangements for this kind of conveyor in particular.

According to the invention, there are provided, in conjunction with a conveyor comprising a plurality of load carriers with spaced fork, finger, grid or like means for supporting the load, a loading or unloading device at each loading or unloading point adapted for cooperating with a carrier to transfer a load thereto or to receive a load therefrom, and means at each loading or unloading point which can be operated to project a carrier to be loaded or unloaded from the path in which the carriers normally move to a path in which the loading or unloading device can cooperate with the carrier to cause a load to be transfererd to or removed from the carrier. Preferably, the loading and/or unloading devices are fixed devices.

The invention can be applied with particular advantage to any of the kinds of elevating and/or lowering conveyors comprising a plurality of trays suspended from a chain or chains which move in a vertically elongated endless path, including the so-called "unistrand" conveyor with trays projecting from a single chain, the "corner-hung" conveyor with chains adjacent to two diagonally opposite corners of the trays and the "straight-through" conveyor with chains adjacent to two opposite sides of the trays. However, the invention can also be applied to a hoist-type of elevator comprising projectable carriers, provided that the method is employed only for loading on the upward movement and for unloading on the downward movement. Finally, it can be applied to conveyors moving in a substantially horizontal path by providing for the carriers to be projected laterally from their normal path for cooperation with the loading or unloading device which, in this case, may require to be a device movable between a retracted, nonobstructive, position, and an operative, for example raised, position.

Figure 1:
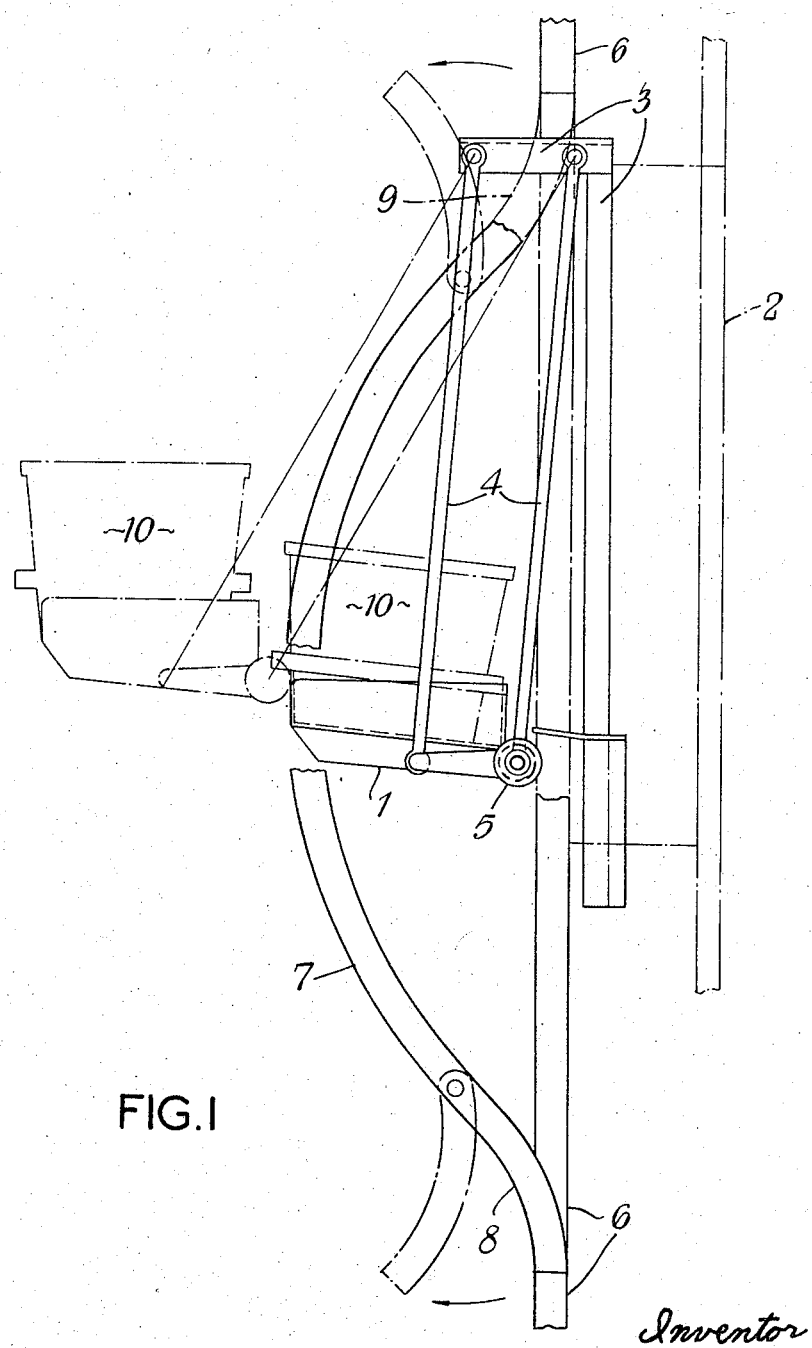
Figure 2:
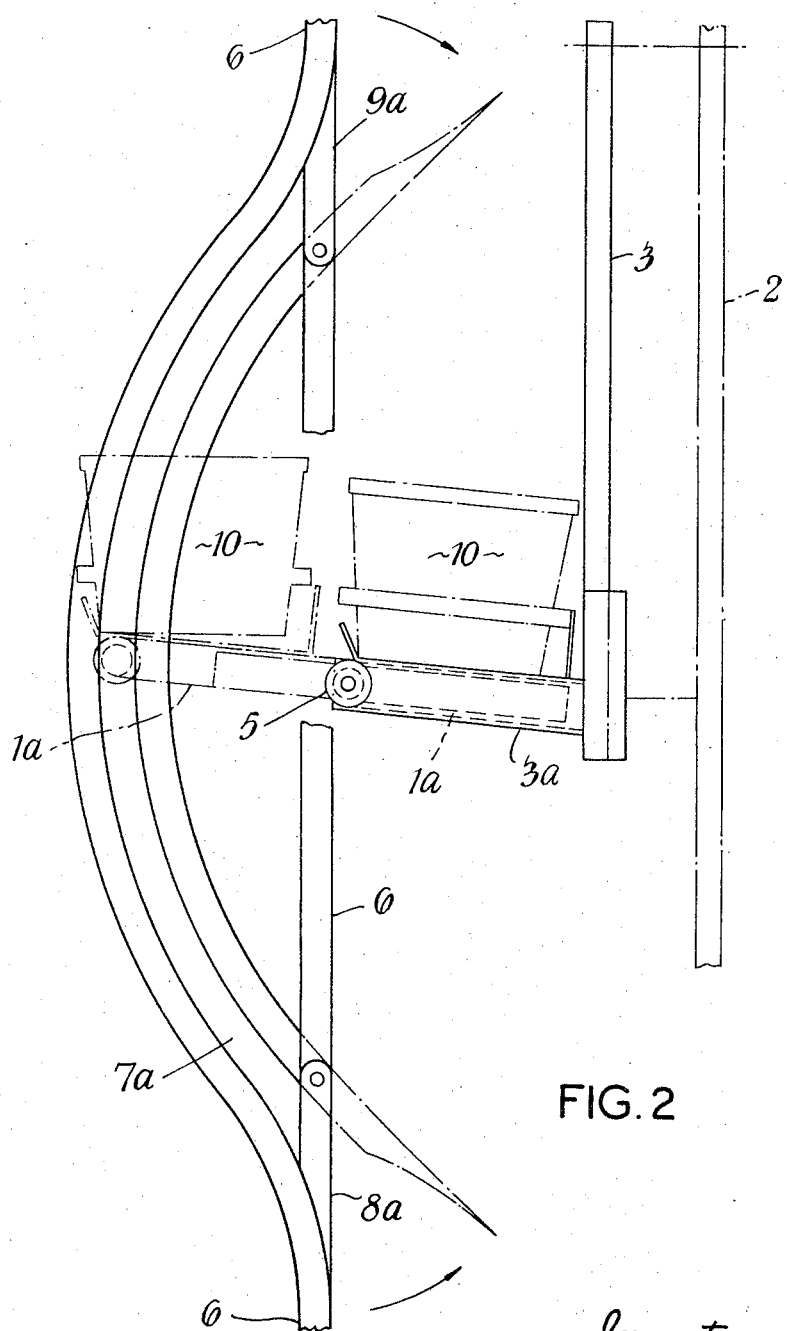

Examples of ways of carrying the invention into effect will now be more fully described with refernce to the accompanying drawings in which each of FIGURES 1 and 2 is a diagrammatic side elevation of part of a conveyor showing one way of carrying out the invention.

In the example illustrated in FIGURE 1, each tray 1 of a selective unistrand conveyor is freely suspended from the continuously moving endless chain 2 by a frame 3 and dependent parallel-linkage 4. Normally, the suspended tray 1 runs by rollers 5 against lateral vertical tracks 6 so that it travels in a vertical path. At each loading and unloading point, however, there are branch tracks 7 of outwardly convex arcuate shape, as seen from the side, onto which the rollers 5 can be caused to pass, if loading or unloading is required, by switching means. Thus, in the case of a loading point associated with the rising side of the conveyor, the lower switching means 8 will be a power-operated gate movable between an inoperative position shown in chain lines and the operative position shown in full lines. The upper switching means 9 is then a spring-loaded gate which normally occupies the position shown in full lines, so as to guide the rollers 5 of a loaded tray 1 smoothly back on to the tracks 6, but which can be deflected by the rollers 5 to allow the passage of a tray which has not been switched on to the branch tracks 7. Conversely, in the case of an unloading point associated with the descending side of the conveyor, the upper switching means 9 will be a gate which is power-operated between the operative position shown in full lines and an inoperative position shown in chain lines, while lower switching means 8 is a spring-loaded gate. The power-operated gate may be controlled in any required manner, for example electromagnetically under the control of switches or other means which can be operated at loading points and which may be located at the said points and/or operated by projections provided on containers loaded upon the trays. When the rollers 5 of a tray 1 are caused to pass onto a branch track 7, the tray is projected outwardly, remaining in its substantially horizontal attitude (as shown by chain lines) due to the parallel linkage 4, into a path in which it will cooperate with a fixed loading or unloading device (not shown) at its point of maximum projection.

For this purpose, in per se known manner, the base of the tray 1 may comprise a fork, fingers or grid with the gap or gaps directed towards the loading or unloading device, which comprises a complementary fork, fingers or grid having the gaps directed towards the tray and capable of interdigitation therewith. Thus, during a loading operation on the rising side of the conveyor, fingers, say, of the tray 1 will pass between fingers of the fixed loading device and will lift from the latter a load resting thereon, for example a container 10 such as is shown in outline. Similarly, during an unloading operation on the descending side of the conveyor, fingers of the tray 1 will deposit a load on the fingers of the fixed unloading device. After passing the loading or unloading point, the tray will be allowed by the branch tracks to return to engagement with, the main vertical tracks by way of the spring-loaded gate.

Alternatively and as shown in FIGURE 2, instead of the tray being swung outwardly on suspension linkage or arms, the base 1a of the tray alone may be arranged to be slid outwardly telescopically from a forwardly projecting part 3a of the frame 3 at a loading or unloading point. For this purpose, follower rollers 5 at the front corners of the base 1a are arranged to be diverted by a power operated gate, 8a or 9a, into branch tracks in the form of arcuate cam slots 7a at a said point, when loading or unloading is required, so that the base 1a is drawn out, to the position shown in chain lines, to cooperate with the fixed loading or unloading device as previously described and is then pushed back or allowed to run back into its normal position. A spring-loaded gate 9a or 8a is provided at the exit end of the cam slots 7a.

Similar arrangements can be employed in the case of corner-hung and straight-through conveyors. It is an advantage, in the case of the latter, that the two chains can be connected by cross rods at intervals without involving any difficulty at loading or unloading points.

Arrangements such as have been described above can be used with advantage in conjunction with conveyors, containers and charging and discharging means which are otherwise of known kind and construction.

I claim:
1. An elevating conveyor comprising a plurality of load carriers provided with spaced load-supporting elements and with guide rollers, tracks by which the said carriers are guided in a vertical path by means of the said rollers, at least one vertically movable endless member, parallel linkages by which the said carriers are suspended from said endless member and by which they are moved past a plurality of load transfer points beside the said vertical path, said points comprising horizontally convexly curved tracks operable to engage the said rollers for automatically projecting a carrier bodily and substantially horizontally away from the said member and from the said vertical path, in which the carriers normally move, to a load-transfer path.

2. An elevating conveyor comprising a plurality of load carriers provided with load-supporting elements and with guide rollers, tracks by which said carriers are guided in a vertical path by means of said rollers, at least one vertically movable endless member by which said carriers are moved, said carriers being suspended from said endless member each by means of a frame having a base in which the respective carrier is telescopically mounted, and a plurality of carrier-projecting means operative to project said carriers telescopically from said base, said carrier projecting means comprising horizontally convexly curved tracks operable to engage with said guide rollers to horizontally project the said carriers telescopically from their respective bases.

References Cited

UNITED STATES PATENTS

| 278,050 | 5/1883 | Ruddell | 198—155 |
| 1,219,898 | 3/1917 | Alvey | 198—157 |
| 1,351,215 | 8/1920 | Olson | 198—155 |
| 1,388,200 | 8/1921 | Price | 198—157 |

OTHER REFERENCES

S30,152, May 1956, printed German application.
1,009,791, June 1957, printed German application.

RICHARD E. AEGERTER, *Primary Examiner.*
EVON C. BLUNK, *Examiner.*